United States Patent
Moorthy

(10) Patent No.: US 8,892,763 B2
(45) Date of Patent: Nov. 18, 2014

(54) LIVE TELEVISION PLAYBACK OPTIMIZATIONS

(75) Inventor: Praveen N. Moorthy, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 53 days.

(21) Appl. No.: 13/342,220

(22) Filed: Jan. 3, 2012

(65) Prior Publication Data

US 2012/0173753 A1 Jul. 5, 2012

Related U.S. Application Data

(60) Provisional application No. 61/429,880, filed on Jan. 5, 2011.

(51) Int. Cl.
```
G06F 15/16      (2006.01)
H04N 21/643     (2011.01)
H04N 21/845     (2011.01)
H04N 21/2387    (2011.01)
H04N 21/234     (2011.01)
H04N 21/438     (2011.01)
H04N 21/262     (2011.01)
H04N 21/434     (2011.01)
H04N 21/61      (2011.01)
```
(52) U.S. Cl.
CPC ....... *H04N 21/23406* (2013.01); *H04N 21/643* (2013.01); *H04N 21/8456* (2013.01); *H04N 21/2387* (2013.01); *H04N 21/4384* (2013.01); *H04N 21/26258* (2013.01); *H04N 21/4345* (2013.01); *H04N 21/6125* (2013.01)
USPC .............................. 709/231; 725/94; 725/105

(58) Field of Classification Search
CPC ................... H04L 29/06176; H04L 29/06455; H04L 29/06462; H04L 29/08693; H04L 12/18; H04L 65/00
USPC ......................................................... 709/231
See application file for complete search history.

(56) References Cited

U.S. PATENT DOCUMENTS 7,647,614 B2 * 1/2010 Krikorian et al. ............... 725/94
2005/0163163 A1   7/2005 Kim et al.
(Continued)

FOREIGN PATENT DOCUMENTS

| EP | 2410738 A1 | 1/2010 |
|----|------------|--------|
| WO | 2009003133 A1 | 12/2008 |
| WO | 2010108053 A1 | 9/2010 |

OTHER PUBLICATIONS

Pantos R et al: "HTTP Live Streaming; draft-pantos-http-live-streaming-03.txt", HTTP Live Streaming; Draft-Pantos-HTTP-Live-Streaming-03.Txt, Internet Engineering Task Force, IETF; Standardworkingdraft, Internet Society (ISOC) 4, Rue Des Falaises Ch-1205 Geneva, Switzerland, No. 3, Apr. 2, 2010, pp. 1-22.

(Continued)

*Primary Examiner* — Jonathan C Teixeira Moffat
*Assistant Examiner* — Eyob Hagos
(74) *Attorney, Agent, or Firm* — Lowenstein Sandler LLP

(57) ABSTRACT

In embodiments of live television playback optimizations, streaming video content is received for distribution to a client device that is implemented to playback a video content stream for display. The video content stream is associated with a content manifest file that identifies video segments of the video content stream. An input can be received from the client device to switch from the video content stream to a new video content stream, and video segments of the new video content stream are buffered. A new content manifest file that correlates to the buffered video segments of the new video content stream is generated. The new content manifest file can then be published to the client device to indicate that a minimum of buffered video segments have been buffered for distribution to the client device before the minimum of buffered video segments have been buffered.

20 Claims, 4 Drawing Sheets

(56) References Cited

U.S. PATENT DOCUMENTS

2009/0164904 A1* 6/2009 Horowitz et al. ............ 715/723
2010/0169303 A1* 7/2010 Biderman et al. ............ 707/723
2010/0312828 A1* 12/2010 Besserglick et al. .......... 709/203
2012/0047542 A1* 2/2012 Lewis et al. .................. 725/97

OTHER PUBLICATIONS

Patent Cooperation Treaty, International Search Report and Written Opinion of the International Searching Authority for International Application No. PCT/US2012/020135, Jul. 11, 2012, 18 pages.

* cited by examiner

US 8,892,763 B2

LIVE TELEVISION PLAYBACK OPTIMIZATIONS

CROSS-REFERENCE TO RELATED APPLICATION

This application claims priority to U.S. Provisional Application 61/429,880, filed on Jan. 5, 2011, the disclosure of which is incorporated by reference herein in its entirety.

FIELD OF THE INVENTION

The present invention is related to digital television.

BACKGROUND OF THE INVENTION

The traditional notion of watching television at home has evolved into many different forms of viewing television content on many different devices. For example, users can watch television content, such as live television, recorded television, and time-shifted programs and movies, on various devices, such as televisions, display devices, entertainment devices, computers, and even mobile devices, such as tablets and mobile phones. However, television content that is viewed on a mobile device, such as a tablet or mobile phone, is primarily content that is either stored on the device or already recorded content that can be streamed to the device without interruption. There are challenges to streaming live television for viewing on a client device, such as the inherent latencies when a user changes channels and has to wait until video data for a new channel are acquired, processed, and buffered to begin playback on the client device. Most television viewers have an expectation of instant channel changes and are not accustomed to the delays that are inherent with live television viewing on client devices.

BRIEF SUMMARY

Streaming video content is received for distribution to a client device that is implemented to playback a video content stream for display. The video content stream is associated with a content manifest file that identifies video segments of the video content stream. An input can be received from the client device to switch from the video content stream to a new video content stream, and video segments of the new video content stream are buffered. A new content manifest file that correlates to the buffered video segments of the new video content stream is generated. The new content manifest file can then be published to the client device to indicate that a minimum of buffered video segments have been buffered for distribution to the client device before the minimum of buffered video segments have been buffered.

BRIEF DESCRIPTION OF THE DRAWINGS

Embodiments of live television playback optimizations are described with reference to the following Figures. The same numbers may be used throughout to reference like features and components that are shown in the Figures.

DETAILED DESCRIPTION

Live television playback optimizations can be implemented for a better user experience when changing television channels on a client device, such as streaming live television from a media streamer to the client device via a router in a home or business environment. Responsive to a channel change input, the media streamer initiates a tuner being tuned, and the transport for a selected television program is acquired, decrypted, transcoded, segmented, and encrypted for streaming the video content to the client device. The media streamer is implemented to reduce or eliminate latencies associated with the television channel change input received from the client device, such as a mobile phone, tablet device, or computer device. In implementations, live television can be streamed to a client device utilizing HTTP Live Streaming or other techniques that may be implemented to stream live television and other video content over HTTP. For example, Dynamic Adaptive Streaming over HTTP may be utilized for streaming content to a client device, and embodiments of live television playback optimizations can be implemented accordingly.

While features and concepts of live television playback optimizations can be implemented in any number of different devices, systems, networks, or configurations, embodiments of live television playback optimizations are described in the context of the following example devices, systems, and methods.

Figure 1:
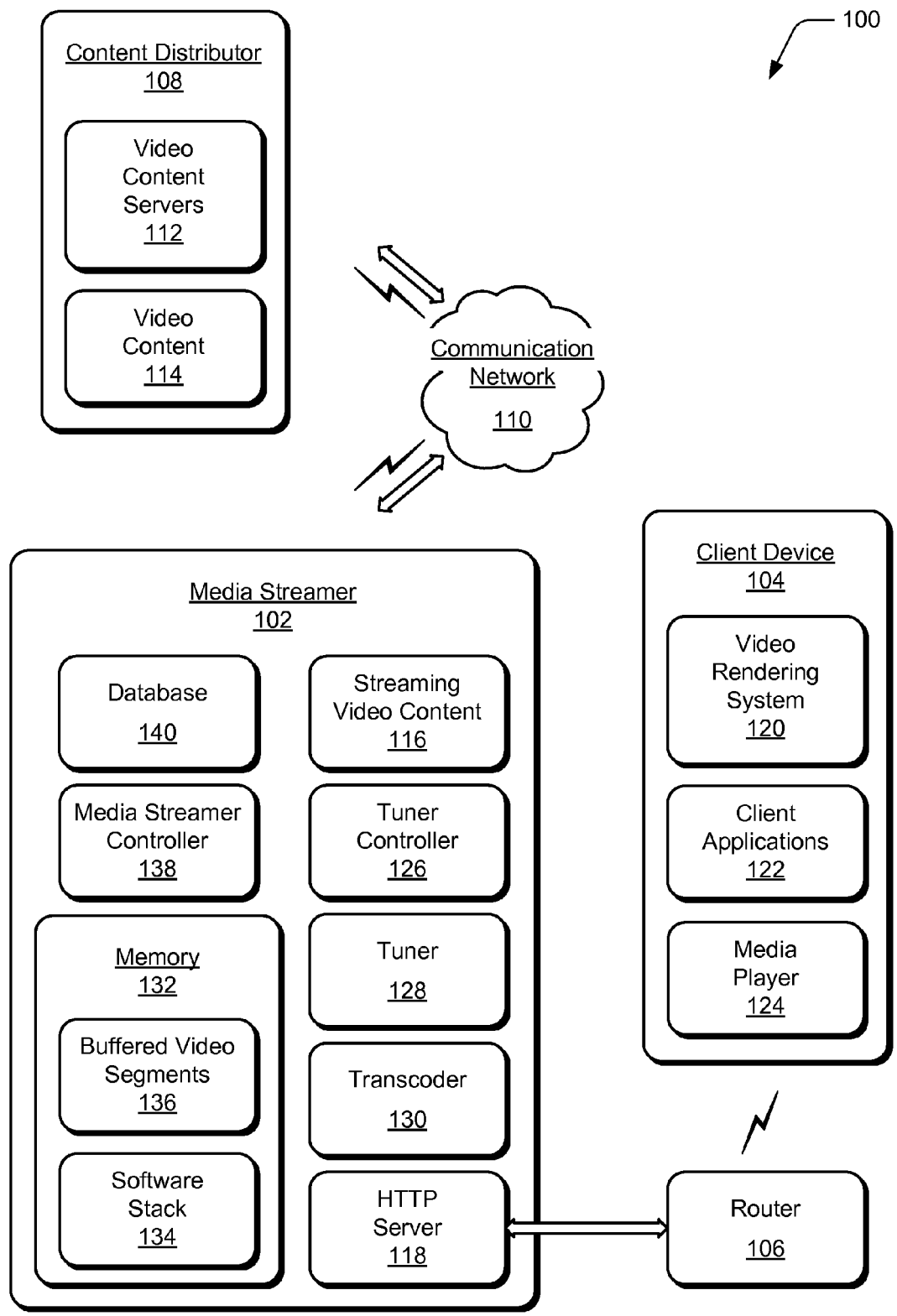
FIG. 1 illustrates an example system in which embodiments of live television playback optimizations can be implemented.

FIG. 1 illustrates an example system 100 in which embodiments of live television playback optimizations can be implemented. The example system 100 includes a media streamer 102 that is implemented to communicate streaming video content to a client device 104 via a router 106, such as in a home or business environment. The example system 100 also includes a content distributor 108 or other video content sources that deliver video content and data to any number of various devices via a communication network 110. Any of the services and devices can communicate via the communication network 110, which can be implemented to include a wired or a wireless network. The communication network 110 can also be implemented using any type of network topology or communication protocol and can be represented or otherwise implemented as a combination of two or more networks to include IP-based networks or the Internet. The communication network 110 may also include mobile operator networks that are managed by a mobile network operator or other network operators, such as a communication service provider, cell-phone provider, or Internet service provider.

The content distributor 108 includes video content servers 112 to distribute video content 114 to the media streamer 102, such as streaming live television that is distributed via a coaxial cable system. The streaming video content 114 can include any type of audio, video, or image data in the form of television programming, movies, on-demand video, interactive games, advertisements, and the like. The content distributor 108 can be implemented with various components, such as a processor and memory devices, as well as with any combination of differing components as further described with reference to the example electronic device shown in FIG. 6. For example, the content distributor 108 includes storage media, such as any type of memory or suitable electronic data storage, to store or otherwise maintain the video content 114 and other data.

The media streamer 102 receives the streaming video content 116 from the content distributor 108, and an HTTP server 118 is implemented to communicate the streaming video content 116, such as live television, to the client device 104 via the router 106. The client device 104 may be implemented as any one or combination of a communication, computer, media playback, gaming, entertainment, or electronic device, such as a mobile phone or tablet device, that can be configured as a television client device to receive and playback video content. The client device 104 can be implemented with various components, such as a processor and memory devices, as well as with any combination of differing components as further described with reference to the example electronic device shown in FIG. 6.

For example, the client device 104 includes a video rendering system 120 to playback video content for viewing on an integrated display device. The client device 104 also includes various client applications 122 that are implemented to manage the video content playback and communication with the media streamer 102 via the router 106. For example, the client device 104 can include a media player 124 that is implemented to manage media content playback. Additionally, the client device 104 can be implemented to utilize the HTTP protocol and REST APIs to communicate with the media streamer 102 to query a list of television channels and initiate tuning to a channel of streaming video content to be decrypted, transcoded, encrypted, and streamed to the client device 104.

As a device, the media streamer 102 can be implemented with various components, such as a processor and memory devices, as well as with any combination of differing components as further described with reference to the example electronic device shown in FIG. 6. In this example, the media streamer 102 includes a tuner controller 126, a tuner 128, and a transcoder 130. The tuner controller 126 can receive an input from the client device 104 to switch from a first video content stream to a second video content stream, such as when a user is watching a television program on the client device 104 and then initiates a channel change. The tuner 128 tunes to the television channel frequency that correlates to the channel change input, and the transcoder 130 then decrypts and transcodes the streaming video content 116. The transcoder 130 may also be implemented with a cryptography module (MCard) to decrypt or transcrypt the streaming video content 116.

The media streamer 102 includes memory 132 that maintains a software stack 134 and can be implemented as a memory buffer for buffered video segments 136 of the streaming video content 116. An example of the buffered video segments 136 is described with reference to FIG. 2, and an example of the software stack 134 is described with reference to FIG. 3. The media streamer 102 also includes a media streamer controller 138 that can be implemented as computer-executable instructions, such as a software application, and executed by one or more processors to implement the various embodiments described herein. The media streamer controller 138 (also referred to as a device controller) implements optimizations for live television playback when a television channel change input is received.

When a channel change input is received from the client device 104, the tuner 128 at the media streamer 102 is tuned, and the transport for the selected television program is acquired, decrypted, transcoded, segmented, and encrypted for streaming to the client device 104. The process can be implemented using the HTTP Live Streaming protocol, in which case the video segments are listed in a content manifest file in the order of playback at the client device 104. An example of content manifest files is described with reference to FIG. 4, and the information regarding content manifest files are maintained in a database 140, such as a SQL database, to track which television channels are tuned and the data that corresponds to a tuned television channel.

Before playback of the video content begins at the client device 104 after a channel change has been initiated, a minimum number of the buffered video segments 136 are typically buffered at the media streamer 102 and identified in the content manifest file that correlates to the streaming video content 116. The transcoder 130 writes the video segments into the memory buffer, and a video segment is multiple frames of the video content. For example, a one-second video segment may include thirty frames, and a client device 104 may be designed to wait for ten seconds of the buffered video segments before the video content is downloaded to the client device 104. For HTTP Live Streaming, a common implementation is ten-second segments with approximately ten of the buffered video segments listed in the content manifest file. This content buffering latency varies with different devices and manufacturers.

In embodiments, the media streamer controller 138 is implemented to publish the content manifest file to the client device 104 to indicate that at least a minimum of the buffered video segments 136 have been buffered for distribution to the client device 104 but before the minimum of the buffered video segments have actually been buffered. Additionally, the buffered video segments 136 are identified in the content manifest file as each new video segment is ready to be downloaded to the client device 104, and communication of the buffered video segments 136 to the client device 104 can be initiated before the minimum of the buffered video segments 136 needed for playback on the client device 104 have been buffered. The content buffering and downloading delays of the buffered video segments 136 are reduced with these optimizations. For example, if the buffered video segments 136 are each ten seconds in duration of video playback, then playback of the video content would not typically start at the client device 104 for approximately ten seconds after a television channel change input. This is improved by implementing a one-second, or even fractional second, of segments, in video playback duration, and only three buffered video segments listed in the content manifest file to begin downloading the buffered video segments 136 for playback at the client device 104.

The media streamer controller 138 is also implemented to cache packet identifiers (PIDs) for the audio and video of the streaming video content 116 to preclude latency associated with acquisition when switching to a video content stream. For example, if a user changes to the same television channel again, rather than acquiring the program association table and the program map table from the transport stream, which may take approximately one-half of a second, the audio and video PIDs can be stored and obtained from a cache.

The media streamer controller 138 is also implemented to generate a new content manifest file that correlates to the buffered video segments 136 for a changed television channel, rather than appending the data to an existing content manifest file. The new content manifest file is generated responsive to a channel change input received from the client device 104. Further, the content manifest file can be regenerated when the content manifest file is requested by the client device 104. For example, the client device 104 can detect new buffered video segments 136 for playback by querying for a content manifest file and downloading the buffered video segments 136 that are published in the content manifest file. Storing the content manifest files in physical storage has the overhead of file locking and storage latency. This latency is reduced by dynamically generating the content manifest file when the client device 104 requests the content manifest file.

Figure 2:
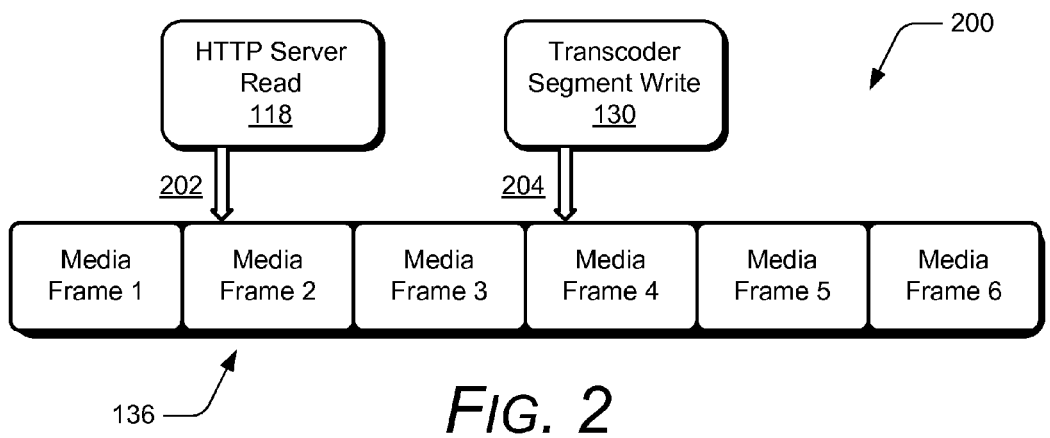
FIG. 2 illustrates an example of buffered video segments for live television playback optimizations in accordance with one or more embodiments.

FIG. 2 illustrates an example 200 of the transcoder 130 at the media streamer 102 shown in FIG. 1 writing the buffered video segments 136 of the streaming video content 116 to a memory buffer, and the HTTP server 118 reading the buffered video data out of the memory buffer for download to the client device 104. The transcoded video segments are written to the memory buffer in the media streamer 102 when bytes are available to be written. In a typical implementation, the corresponding content manifest file is not published to the client device 104 until a minimum number of the transcoded video segments are written to the storage device. In embodiments, this is optimized by publishing the content manifest file to the client device 104 when the first set of transcoded video segments are available, and the file is then progressively downloaded to the client device 104. This provides that video segments will be transcoded and downloaded for playback at the client device 104 much sooner, and as long as the HTTP server read pointer 202 does not overlap the transcoder write pointer 204, the video segments can be streamed to the client device 104 before the content listed in the manifest file is fully written.

Figure 3:
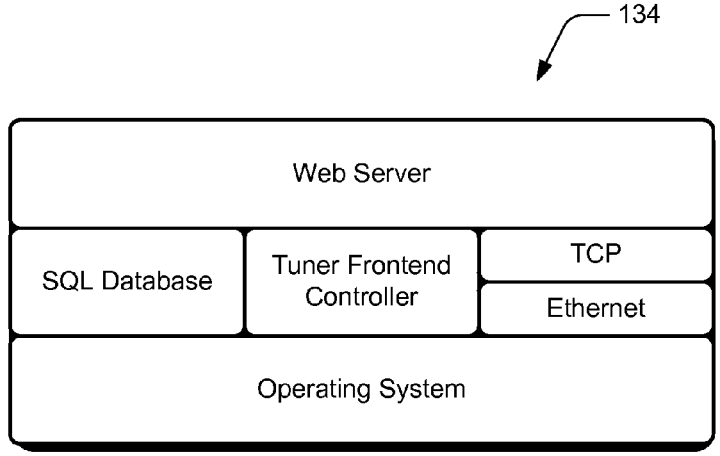
FIG. 3 illustrates an example software stack for a media streamer that implements embodiments of live television playback optimizations.

FIG. 3 illustrates an example of the software stack 134 shown in FIG. 1, and implemented in the media streamer 102. In this example, the software stack 134 includes a Web server, an implementation of the SQL database application (e.g., the database 140 shown in FIG. 1), an implementation of the tuner controller 126 (also referred to as a tuner frontend controller), provisions for TCP and Ethernet communication, and an operating system, such as LINUX.

Figure 4:
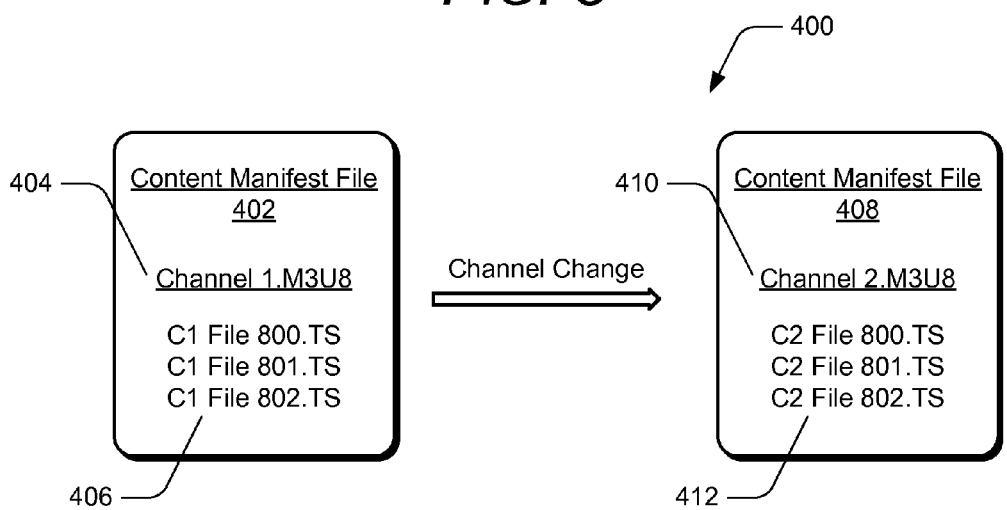
FIG. 4 illustrates an example of content manifest files that are generated in accordance with one or more embodiments.

FIG. 4 illustrates an example 400 of content manifest files stored in the database 140 of the media streamer 102 described with reference to FIG. 1. A first content manifest file 402 correlates to a first television channel (e.g., channel one) of streaming video content 116. The first television channel is identified at 404, and the consecutive file segment numbers are identified at 406. A second content manifest file 408 correlates to a second television channel (e.g., channel two) of streaming video content 116. The second television channel is identified at 410, and the consecutive file segment numbers are identified at 412. When a television channel change input is received at the media streamer 102, a new content manifest file is generated, rather than appending to the current manifest file. When a television channel change is initiated in a conventional implementation, identification of the new transcoded video segments are appended to the end of the current manifest file, in which case the video segments for the subsequent television channel cannot be played back at the client device 104 until all of the preceding video segments for the previous television channel are cleared out and played back. This channel change latency is eliminated by generating the new content manifest file responsive to a television channel change input.

Example method 500 is described with reference to FIG. 5 in accordance with one or more embodiments of live television playback optimizations. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local or remote to a computer processor. The methods may also be practiced in a distributed computing environment by multiple computer devices. Further, the features described herein are platform-independent and can be implemented on a variety of computing platforms having a variety of processors.

Figure 5:
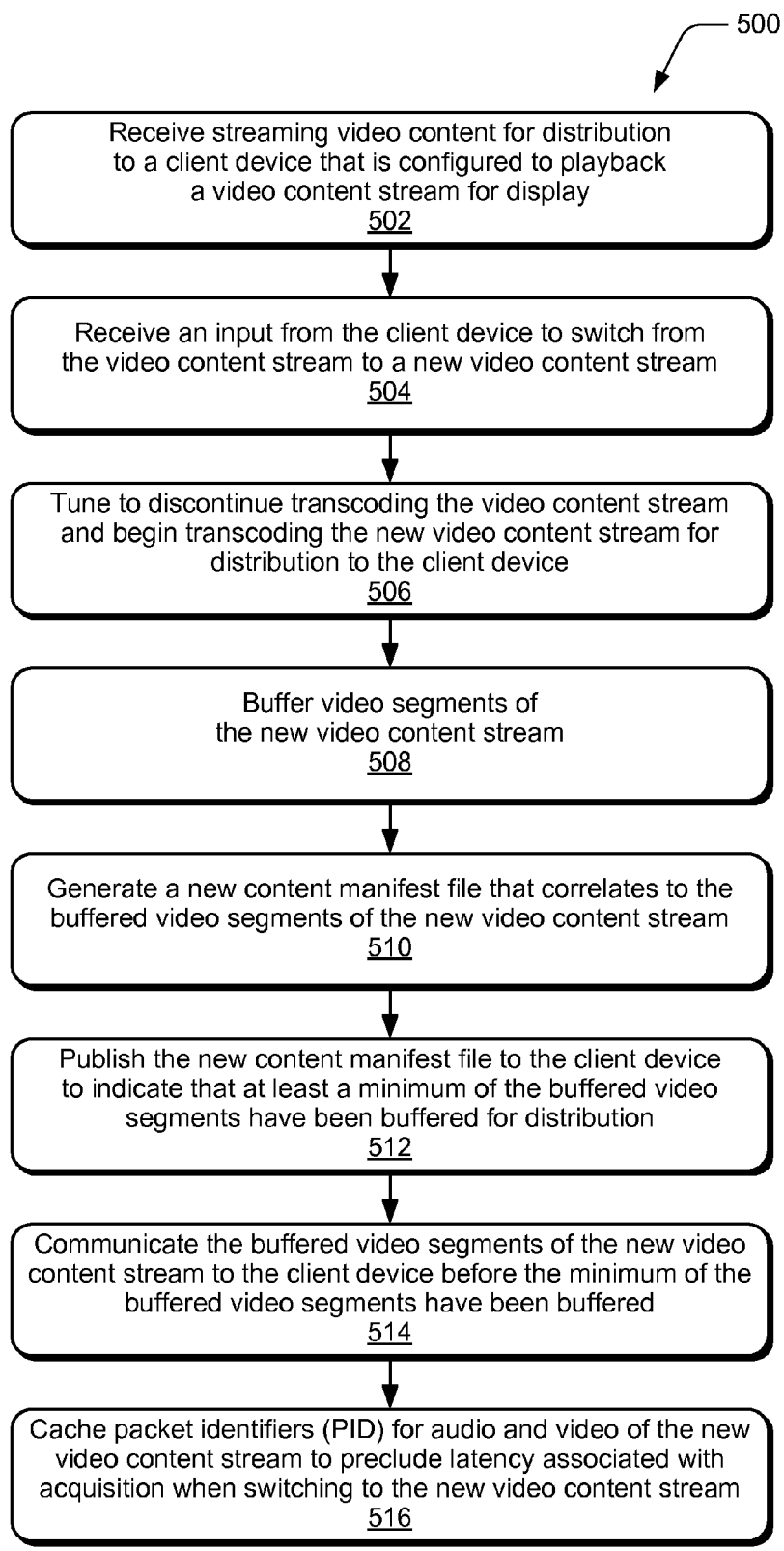
FIG. 5 illustrates an example method of live television playback optimizations in accordance with one or more embodiments.

FIG. 5 illustrates an example method 500 of live television playback optimizations. The order in which the method blocks are described is not intended to be construed as a limitation, and any number or combination of the described method blocks can be combined in any order to implement a method or an alternate method.

At block 502, streaming video content is received for distribution at a client device 104 that is configured to playback a video content stream for display. For example, the media streamer 102 (FIG. 1) receives the streaming video content 116 from the content distributor 108, such as live television streaming content received via a coaxial cable system. The video content stream is associated with a content manifest file that identifies buffered video segments 136 of the video content stream to the client device 104.

At block 504, an input is received from the client device 104 to switch from the video content stream to a new video content stream. For example, the tuner controller 126 at the media streamer 102 receives a television channel change input from the client device 104 to initiate a switch from the video content stream to a new video content stream.

At block 506, the new video content stream is tuned to discontinue transcoding the video content stream and begin transcoding the new video content stream for distribution to the client device 104. For example, the tuner 128 at the media streamer 102 tunes to initiate the transcoder 130 transcoding the new video content stream (e.g., the streaming video content 116). At block 508, video segments of the new video content stream are buffered. For example, the memory 132 at the media streamer 102 maintains the buffered video segments 136 as they are transcoded.

At block 510, a new content manifest file that correlates to the buffered video segments of the new video content stream is generated. For example, the media streamer controller 138 at the media streamer 102 generates the new content manifest file 408 (FIG. 4) that correlates to the new video content stream, and the buffered video segments 136 are identified in the new content manifest file as each new video segment is ready to be downloaded to the client device 104. In some embodiments, the new content manifest file is regenerated when the content manifest file is requested by the client device 104.

At block 512, the new content manifest file is published to the client device 104 to indicate that at least a minimum of the buffered video segments 136 have been buffered for distribution. For example, the media streamer controller 138 at the media streamer 102 publishes the new content manifest file to the client device 104 to indicate that a minimum of the buffered video segments 136 have been buffered for distribution to the client device 104 but before the minimum of the buffered video segments have actually been buffered.

At block 514, the buffered video segments 136 of the new video content stream are communicated to the client device 104 before the minimum of the buffered video segments 136 have been buffered. For example, the HTTP server 118 at the media streamer 102 communicates the buffered video segments 136 to the client device 104 before the minimum of the buffered video segments 136 have been buffered. The streaming video content 116 is communicated to the client device 104 via the router 106 that is implemented for wireless communication with the client device 104.

At block 516, PIDs for audio and video of the new video content stream are cached to preclude latency associated with acquisition when switching to the new video content stream. For example, the media streamer controller 138 at the media streamer 102 initiates caching audio and video PIDs of the new video content stream in the event that a user changes to the same television channel again. Rather than acquiring the program association table and the program map table from the transport stream, the audio and video PIDs are stored and obtained from a cache.

Figure 6:
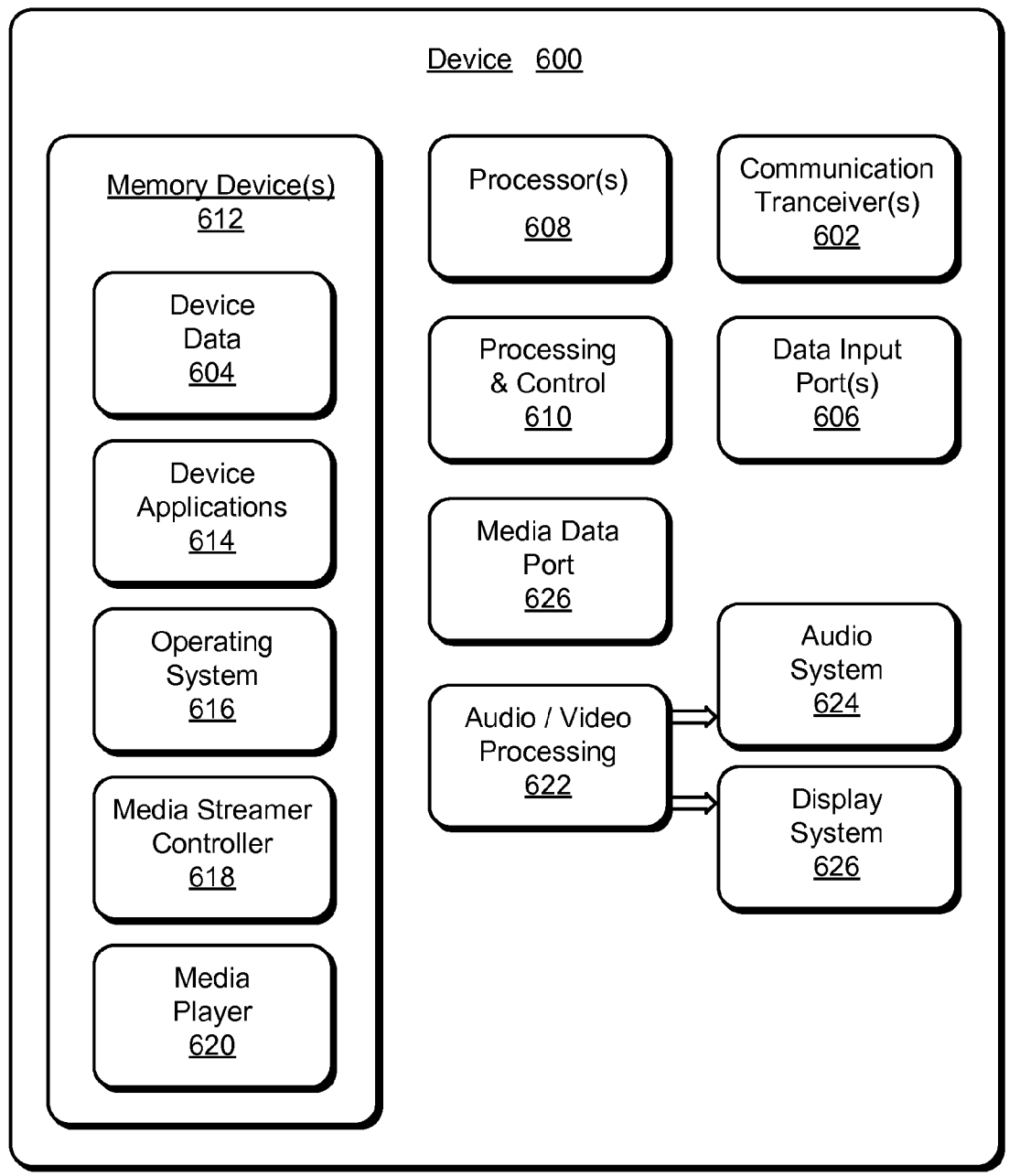
FIG. 6 illustrates various components of an example electronic device (also referred to as a client device) that can implement embodiments of live television playback optimizations.

FIG. 6 illustrates various components of an example electronic device 600 that can be implemented as any device described with reference to any of the previous FIGS. 1 through 5. In some embodiments, the electronic device 600 may be implemented as a media streamer 102, a client device 104, or the content distributor 108, such as described with reference to FIG. 1. Alternatively or in addition, the electronic device 600 may be implemented in any form of device 600 that can receive and playback streaming video content, such as any one or combination of a communication, computer, media playback, gaming, entertainment, mobile phone, or tablet computing device.

The electronic device 600 includes communication transceivers 602 that enable wired or wireless communication of device data 604, such as received data, data that is being received, data scheduled for broadcast, data packets of the data, etc. Example transceivers include wireless personal area network radios compliant with various IEEE 802.15 standards, wireless local area network radios compliant with any of the various IEEE 802.11 standards, wireless wide area network radios for cellular telephony, wireless metropolitan area network radios compliant with various IEEE 802.15 standards, and wired local area network Ethernet transceivers.

The electronic device 600 may also include one or more data input ports 606 via which any type of data, media content, or inputs can be received, such as user-selectable inputs, messages, music, television content, recorded video content, and any other type of audio, video, or image data received from any content or data source. The data input ports may include USB ports, coaxial cable ports, and other serial or parallel connectors (including internal connectors) for flash memory, DVDs, CDs, and the like. These data input ports 606 may be used to couple the electronic device 600 to components, peripherals, or accessories such as microphones or cameras.

The electronic device 600 includes one or more processors 608 (e.g., any of microprocessors, controllers, and the like), which process computer-executable instructions to control operation of the device 600. Alternatively or in addition, the electronic device 600 can be implemented with any one or combination of software, hardware, firmware, or fixed logic circuitry that is implemented in connection with processing and control circuits, which are generally identified at 610. Although not shown, the electronic device 600 can include a system bus or data transfer system that couples the various components within the device 600. A system bus can include any one or combination of different bus structures, such as a memory bus or memory controller, a peripheral bus, a universal serial bus, or a processor or local bus that utilizes any of a variety of bus architectures.

The electronic device 600 also includes one or more memory devices 612 that enable data storage, examples of which include random access memory, non volatile memory (e.g., read-only memory, flash memory, EPROM, EEPROM, etc.), and a disk storage device. A disk storage device may be implemented as any type of magnetic or optical storage device, such as a hard disk drive, a recordable or rewriteable disc, any type of a DVD, and the like. The electronic device 600 may also include a mass storage media device.

A memory device 612 provides data storage mechanisms to store the device data 604, other types of information or data, and various device applications 614 (e.g., software applications). For example, an operating system 616 can be maintained as software instructions within a memory device 612 and executed on the processors 608. The device applications 614 may also include a device manager, such as any form of a control application, software application, signal-processing and control module, code that is native to a particular device, a hardware abstraction layer for a particular device, and so on. The electronic device 600 may also include a media streamer controller 618 and a media player 620, such as for a media streamer device 102, to implement embodiments of live television playback optimizations.

The electronic device 600 also includes an audio or video processing system 622 that generates audio data for an audio system 624 or generates display data for a display system 626. The audio system 624 or the display system 626 may include any devices that process, display, or otherwise render audio, video, display, or image data. Display data and audio signals can be communicated to an audio component or to a display component via a radio frequency link, S-video link, high-definition multimedia interface, composite video link, component video link, digital video interface, analog audio connection, or other similar communication link, such as the media data port 626. In some implementations, the audio system 624 or the display system 626 is an external component to the electronic device 600. Alternatively, the audio system 624 or the display system 626 is an integrated component of the example electronic device 600.

Although embodiments of live television playback optimizations have been described in language specific to features or methods, the subject of the appended claims is not necessarily limited to the specific features or methods described. Rather, the specific features and methods are disclosed as example implementations of live television playback optimizations.

I claim:

1. A method comprising:
   receiving streaming video content for distribution to a client device that is configured to playback a first video content stream for display, the first video content stream associated with a content manifest file that identifies video segments of the first video content stream, wherein the streaming video content is received as live television content;
   receiving a user input from the client device to switch from the first video content stream to a second video content stream;
   tuning to discontinue transcoding the first video content stream and begin transcoding the second video content stream for distribution to the client device;

buffering video segments of the second video content stream;

generating a new content manifest file that correlates to the buffered video segments of the second video content stream; and publishing, by a processor, the new content manifest file to the client device to indicate that at least a minimum of the buffered video segments have been buffered for distribution to the client device before the minimum of the buffered video segments have actually been buffered.

2. The method as recited in claim 1 wherein the new content manifest file is published to the client device before the minimum of the buffered video segments have been buffered.

3. The method as recited in claim 2 further comprising:
identifying the buffered video segments in the new content manifest file as each new video segment is ready to be downloaded to the client device.

4. The method as recited in claim 2 further comprising:
communicating the buffered video segments of the second video content stream to the client device before the minimum of the buffered video segments have been buffered.

5. The method as recited in claim 1:
wherein the user input from the client device is received as a television channel change input.

6. The method as recited in claim 1 further comprising:
communicating the streaming video content to the client device via a router configured for wireless communication with the client device.

7. The method as recited in claim 1 further comprising:
regenerating the new content manifest file when the new content manifest file is requested by the client device.

8. The method as recited in claim 1 further comprising:
caching packet identifiers for audio and video of the second video content stream to preclude latency associated with acquisition when switching to the second video content stream.

9. A streaming video content device comprising:
a tuner controller configured to receive a user input from a client device to switch from a first video content stream to a second video content stream, and tune to discontinue transcoding the first video content stream and begin transcoding the second video content stream for distribution to the client device, wherein the first and second video content streams are received as live television content;
a memory buffer configured to receive and buffer video segments of the second video content stream; and
a device controller configured to:
maintain a content manifest file that identifies video segments of the first video content stream;
generate a new content manifest file that correlates to the buffered video segments of the second video content stream; and
publish the new content manifest file to the client device to indicate that at least a minimum of the buffered video segments have been buffered for distribution to the client device before the minimum of the buffered video segments have actually been buffered.

10. The streaming video content device as recited in claim 9 wherein the device controller is configured to publish the new content manifest file to the client device before the minimum of the buffered video segments have been buffered.

11. The streaming video content device as recited in claim 10 wherein the device controller is configured to identify the buffered video segments in the new content manifest file as each new video segment is ready to be downloaded to the client device.

12. The streaming video content device as recited in claim 10 wherein the device controller is configured to initiate communication of the buffered video segments of the second video content stream to the client device before the minimum of the buffered video segments have been buffered.

13. The streaming video content device as recited in claim 9 wherein the input from the client device is received as a television channel change input.

14. The streaming video content device as recited in claim 9 further comprising an HTTP server configured to communicate the buffered video segments as streaming video content to the client device via a router that is configured for wired or wireless communication with the client device.

15. The streaming video content device as recited in claim 9 wherein the device controller is further configured to regenerate the new content manifest file when the new content manifest file is requested by the client device.

16. The streaming video content device as recited in claim 9 wherein the device controller is configured to cache packet identifiers for audio and video of the second video content stream to preclude latency associated with acquisition when switching to the second video content stream.

17. A non-transitory computer readable storage including instructions that, when executed by a processor, cause the processor to perform operations comprising:
receiving streaming video content for distribution to a client device that is configured to playback a first video content stream for display, the first video content stream associated with a content manifest file that identifies video segments of the first video content stream, wherein the streaming video content is received as live television content;
receiving a user input from a client device to switch from the first video content stream to a second video content stream;
tuning to discontinue transcoding the first video content stream and begin transcoding the second video content stream for distribution to the client device;
buffering video segments of the second video content stream;
generating a content manifest file that correlates to the buffered video segments of the second video content stream; and
publishing, by the processor, the content manifest file to the client device to indicate that at least a minimum of the buffered video segments have been buffered for distribution to the client device before the minimum of the buffered video segments have been buffered.

18. The non-transitory computer readable storage as recited in claim 17 wherein the content manifest file is published to the client device before the minimum of the buffered video segments have been buffered.

19. The non-transitory computer readable storage as recited in claim 17, the operations further comprising:
communicating the buffered video segments of the second video content stream to the client device before the minimum of the buffered video segments have been buffered.

20. The non-transitory computer readable storage as recited in claim 17, the operations further comprising:
regenerating the content manifest file when the content manifest file is requested by the client device.

* * * * *